United States Patent
Chow et al.

(10) Patent No.: US 7,353,368 B2
(45) Date of Patent: Apr. 1, 2008

(54) METHOD AND APPARATUS FOR ACHIEVING ARCHITECTURAL CORRECTNESS IN A MULTI-MODE PROCESSOR PROVIDING FLOATING-POINT SUPPORT

(75) Inventors: Michael Chow, Cupertino, CA (US); Elango Ganesan, Seiad Valley, CA (US); John William Phillips, Menlo Park, CA (US); Nazar Abbas Zaidi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 09/505,949

(22) Filed: Feb. 15, 2000

(65) Prior Publication Data

US 2003/0154366 A1     Aug. 14, 2003

(51) Int. Cl.
*G06F 9/30*       (2006.01)
(52) U.S. Cl. .................. 712/229; 712/210; 712/209
(58) Field of Classification Search ............... 712/222, 712/209, 210, 229
See application file for complete search history.

(56) References Cited

U.S. PATENT DOCUMENTS

| | | | | |
|---|---|---|---|---|
| 5,204,828 A | * | 4/1993 | Kohn .......................... 708/501 |
| 5,481,684 A | * | 1/1996 | Richter et al. ................. 703/26 |
| 5,568,646 A | * | 10/1996 | Jaggar ......................... 712/209 |
| 5,611,063 A | * | 3/1997 | Loper et al. ................. 712/205 |
| 5,638,525 A | * | 6/1997 | Hammond et al. ......... 712/209 |
| 5,685,009 A | * | 11/1997 | Blomgren et al. ............ 712/23 |
| 5,734,904 A | * | 3/1998 | Kanamori et al. ........... 719/331 |
| 5,757,826 A | * | 5/1998 | Fredrickson ................ 714/784 |
| 5,781,457 A | * | 7/1998 | Cohen et al. ............... 708/231 |
| 5,781,750 A | * | 7/1998 | Blomgren et al. ........... 712/209 |
| 5,812,439 A | * | 9/1998 | Hansen ....................... 708/497 |
| 5,884,057 A | * | 3/1999 | Blomgren et al. ............. 703/26 |
| 6,044,454 A | * | 3/2000 | Schwarz et al. .............. 703/26 |
| 6,076,155 A | * | 6/2000 | Blomgren et al. ........... 712/225 |
| 6,148,395 A | * | 11/2000 | Dao et al. .................... 712/220 |
| 6,230,256 B1 | * | 5/2001 | Guenthner ................... 712/210 |
| 6,292,845 B1 | * | 9/2001 | Fleck et al. ..................... 710/5 |
| 6,366,998 B1 | * | 4/2002 | Mohamed ..................... 712/17 |

(Continued)

OTHER PUBLICATIONS

An American National Standard: IEEE Standard for Binary Floating-Point Arithmetic. © 1985.*

(Continued)

*Primary Examiner*—Aimee J Li
(74) *Attorney, Agent, or Firm*—Blakely, Sokoloff, Taylor & Zafman LLP

(57) ABSTRACT

A method comprising fetching an input from at least one of a plurality of floating-point registers and detecting whether the input includes a token. If the token is detected in the input, checking what mode the processor is in. If the processor is in a first mode, processing the input to render an arithmetic result. If the processor is in a second mode, performing a token specific operation. And producing an output. The present invention also provides a processor comprising a first instruction set engine, a second instruction set engine, and a mode identifier. A plurality of floating-point registers are shared by the first instruction set engine and the second instruction set engine. A floating-point unit is coupled to the floating-point registers. The floating-point unit processes an input responsive to the mode identifier and the input to produce an output.

16 Claims, 3 Drawing Sheets

U.S. PATENT DOCUMENTS

| | | |
|---|---|---|
| 6,408,380 B1 * | 6/2002 | Huck et al. ................ 712/225 |
| 6,430,674 B1 * | 8/2002 | Trivedi et al. ............... 712/43 |
| 6,438,621 B1 * | 8/2002 | Kanamori et al. .......... 719/331 |
| 6,438,700 B1 * | 8/2002 | Adusumilli ................ 713/323 |
| 6,442,676 B1 * | 8/2002 | Guenthner ................ 712/210 |
| 6,446,221 B1 * | 9/2002 | Jaggar et al. ................ 714/30 |

OTHER PUBLICATIONS

Heuring, Vincent P. and Jordan, Harry F. Computer Systems Design and Architecture. Reading, Mass.: Addision-Wesley, © 1997. Section 3.2 pp. 90-95.*

Free On-line Dictionary of Computing. Search term: mantissa © 1996. http://foldoc.doc.ic.ac.uk/foldoc/foldoc.cgi?query=Mantissa.*

"What Every Computer Scientist Should Know About Floating-Point Arithmetic". Goldberg, David. © 1991. http://docs.sun.com/source/806-3568/ncg_goldberg.html Sections: Floating-point Formats and Footnotes.*

InstantWeb. Online Computing Dictionary. © 1994-1999. http://www.instantweb.com/foldoc/foldoc.cgi?computer+dictionary Search Terms: RISC; CISC; x86; Intel 80×86; Speculative Evaluation; and Speculative Execution.*

DeMone, Paul. "RISC vs. CISC Still Matters". © Feb. 13, 2004. http://ctas.east.asu.edu/bgannod/CET520/Spring02/Projects/demone.htm.*

Ryan, Bob. "NexGen Nx586 Straddles the RISC/CISC Divide". © Jun. 1994. http://www.byte.com/art/9406/9406.htm.*

Omondi, Amos R. "The Microarchitecture of Pipelined and Superscalar Computers". Boston, Mass.: Kluwer Academic Publishers, © 1999. Sections: 1.1, 1.3, and 1.5.*

Graf, Rudolf F. "Modern Dictionary of Electronics". Sixth Edition. Indianapolis, Indiana: Howard W. Sams & Company, © 1984. pp. 1132, term "word" and 1133, term "word size".*

Memorandum from Stephen G. Kunin dated Jun. 25, 2003.* www.dictionary.com © 2000 search term: token.*

Chartier, Roy. "Microprocessor Basics". MONiTOR Magazine Online. vol. 2, Issue 7. © Feb. 1995. http://www.monitor.ca/monitor/issues/vol2iss7/feature3.html.*

Gerritsen, Armin. "CISC vs. RISC". CPU Site. © Mar. 1999. http://www.tomax7.com/aplus/APlusCD/CISC%20vs%20RISC.doc.*

Hennessy, John L. and Patterson, David A. "Computer Architecture: A Quantitative Approach". Second Edition. San Francisco, CA: Morgan Kaufmann Publishers, Inc., © 1996. pp. 68-73 and 80-86.*

* cited by examiner

METHOD AND APPARATUS FOR ACHIEVING ARCHITECTURAL CORRECTNESS IN A MULTI-MODE PROCESSOR PROVIDING FLOATING-POINT SUPPORT

FIELD OF THE INVENTION

The present invention relates to the field of processor architecture. More specifically, this invention relates to the field of implementing floating-point mathematical support in a processor.

BACKGROUND

Processors have become ubiquitous in modern society. Processors are found in many popularly used electronic devices such as, for example, personal computers, personal digital assistants, and cellular phones. Processors are also used in devices not thought of as traditionally being electronics, for example, automobiles and coffee makers. Processors used in today's most popular computers include software typically referred to as microcode. Microcode within a processor is implemented to achieve a defined set of assembly language instructions which are executed by the processor known as the processor's instruction set. A processor's instruction set and how the instruction set is used to achieve a certain result are referred to as the processor's instruction set architecture ("ISA"). The processor's ISA also necessarily describes much of the processor's internal architecture. The assembly language instructions of a processor's instruction set internally access data of a defined size commonly known as a word. The word size of a processor is defined by the processor's ISA. Earlier personal computers, for example, the IBM PC sold by International Business Machines of Armonk, N.Y. included a processor (the 8086) manufactured by Intel Corporation of Santa Clara, Calif. which had a word size of 16 bits. As the personal computer has evolved, processing power has increased by, among other things, increasing the word size of a processor. Increasing the word size allows a processor to process more data in a shorter amount of time. Many current personal computers implement 32 bit word ISAs, while future personal computers will be implementing 64 bit word ISAs. Larger computers such as mainframes have ISAs with larger word sizes while smaller devices such as hand held personal digital assistants and cellular telephones have smaller word sizes.

Mathematical computations which require vary large numbers, require high precision, and/or include complex mathematical equations are called floating-point calculations. When programming software, floating-point numbers are used when performing floating-point calculations. Floating-point numbers are often declared as "real" numbers in software. Floating-point numbers are commonly defined as having three parts: a sign, a significand (also known as a mantissa), and an exponent. Two well known standards set a framework for how floating-point numbers and calculations should be implemented—I.E.E.E. standard 754 (1985, reaffirmed 1990), the Standard for Binary Floating-Point Arithmetic; and I.E.E.E. standard 854 (1987), the Standard for Radix-Independent Floating-Point Arithmetic; available from the Institute of Electrical and Electronics Engineers, Inc., 445 Hoes Lane, Piscataway, N.J. 08855-1331 (collectively, I.E.E.E. Floating-Point Standards).

Floating-point support has been implemented in a number of ways with processors. In earlier personal computers, a floating-point co-processor was optionally available to be installed with and to assist a processor in handling floating-point calculations (e.g., Intel Corporation provided a Numeric Processor Extension chip named the 8087 to accompany the widely used 8086 processor). As personal computers have evolved, processors have incorporated floating-point capability within a processor by including one or more floating-point units in a processor. In addition, when floating-point capability is provided within a processor, memory internal to the processor is designated for use by and with floating-point units. Such memory is designated by the processor's architecture and ISA as the processor's floating-point registers. Floating-point registers are typically larger than other registers within the processor as they are designed to accommodate larger and/or more precise numbers by providing enough space for the sign, significand, and exponent of "real" numbers.

Traditionally, only specialized scientific and accounting application programs accessed a processor's floating-point capabilities. However, today, colorful graphic and multimedia images are in widespread use in, for example, internet web pages, architectural software applications, computer games, and animation creation programs. These images are stored in various compressed or encoded formats. The more detailed and higher resolution a graphical image is, the more floating-point calculations are needed to process (i.e., decompress or decode) and render the image on a computer monitor. As the use of graphic images has become popular and continues to grow, the use of a processor's floating-point mathematical capabilities has been increasing. Other factors such as use for audio processing are also contributing to an increased use of a processor's floating-point mathematical capabilities. To accommodate these and other needs, and to meet the ever growing demand for increased floating-point performance, the floating-point capability of processors is continually evolving.

SUMMARY

One embodiment of the present invention includes a processor comprising a first instruction set engine, a second instruction set engine, and a mode identifier. A plurality of floating-point registers are shared by the first instruction set engine and the second instruction set engine. A floating-point unit is coupled to the floating-point registers. The floating-point unit processes an input responsive to the mode identifier to produce an output.

BRIEF DESCRIPTION OF THE DRAWINGS

The features and advantages of the present invention will become apparent from the following detailed description of the present invention in which.

DETAILED DESCRIPTION

Figure 1:
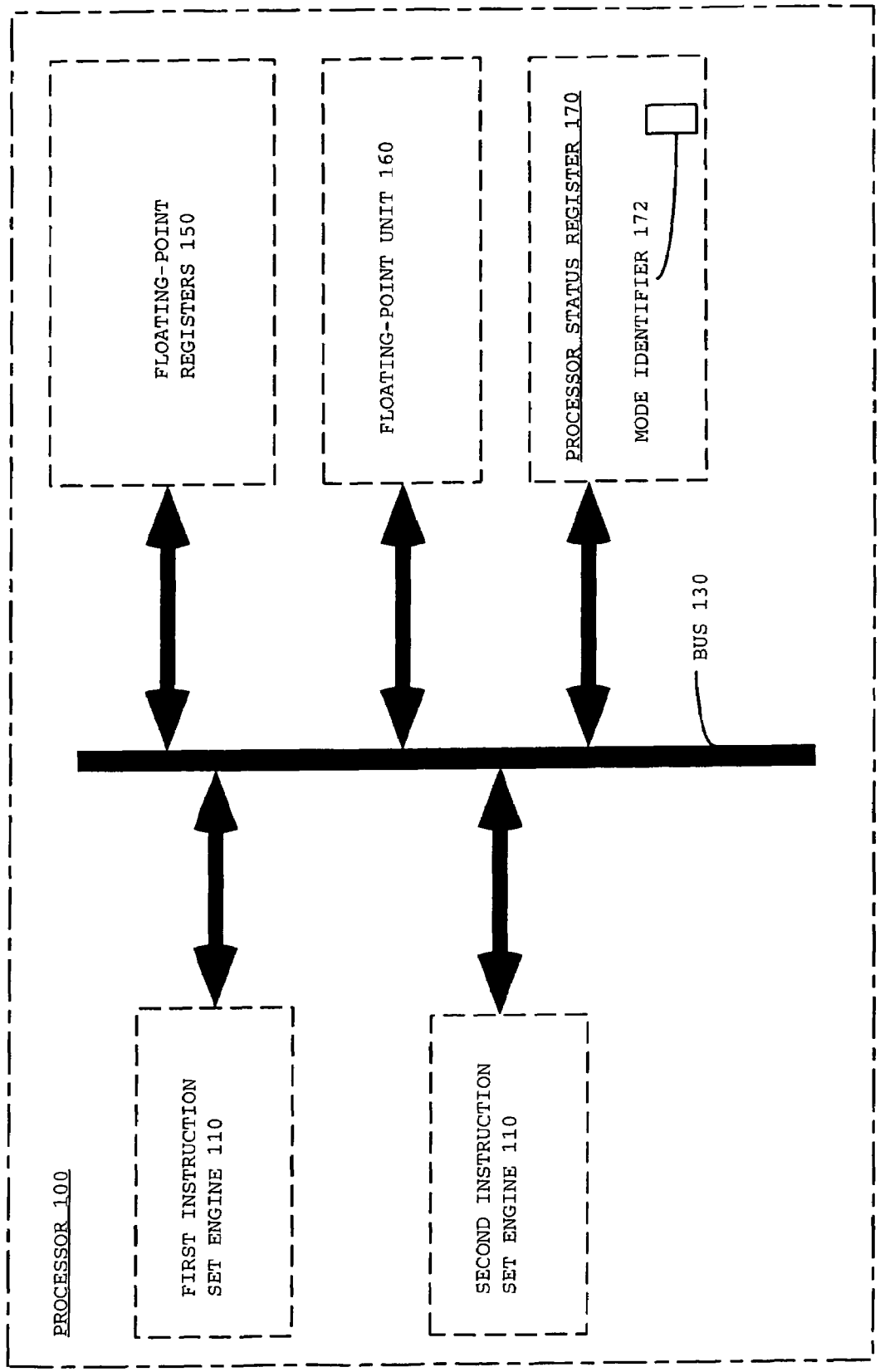
FIG. 1 illustrates one embodiment of a processor that implements the method and apparatus of the present invention to achieve architectural correctness when providing floating-point support in a multi-mode processor.

The present invention relates to efficiently providing floating-point mathematical capabilities in a processor that supports two instruction set architectures. As increased use is being made of floating-point capabilities of a processor, processors are being designed to provide better floating-point support and increased floating-point performance. When creating a new processor with a new ISA to improve on existing technology, older instruction sets and ISAs may be supported to provide compatibility with software written for older processors. Such backward compatibility is commonly referred to as "legacy" support. When implementing a multi-mode processor that supports two different ISAs, certain functionality included in one ISA, typically the newer ISA, is not included in the other ISA, typically the older ISA. Pertinent to this invention is the sharing of floating-point components in a multi-mode processor that supports two different ISAs and, in particular, when the newer ISA provides a feature that is not supported by and/or interferes with concurrent implementations of the older ISA.

Herein, certain examples of hardware and methods of operation are described in an illustrative sense, and should not be construed in a restrictive sense. To clarify various qualities of the present invention, terminology is used to discuss certain features. In particular, an "electronic system" is defined as any hardware with processing and data storage capability. Examples of electronic systems include computers (e.g., laptop, desktop, hand-held, server, etc.), imaging equipment (e.g., printers, facsimile machines, scanners, etc.), wireless communication equipment (e.g., cellular phones, pagers, etc.), automated teller machines and the like. "Data" is defined as one or more bits of information, address, numbers, characters, control or any combination thereof. A "bus" is any medium used to transfer data.

In one embodiment, a processor is capable of operating in two modes, a first mode and a second mode. The first and second modes are a 32 bit word ISA and a 64 bit word ISA, respectively. More specifically, the first mode is IA-32 mode in which the processor emulates a 32 bit word Intel Architecture (IA) known as the IA-32 ISA as described in *Intel Architecture Software Developer's Manual*: Vol. 1—*Basic Architecture* (order no. 243190), Vol. 2—*Instruction Set Reference* (order no. 243191), and Vol. 3—*System Programming Guide* (order no. 243192). The original IA-32 ISA has been enhanced by adding MMX® and Streaming SIMD (single instruction multiple data) Extension (SSE) instructions which enhance graphics and other capabilities of the instruction set. Further information on MMX® is available in *MMX Technology Architecture Overview, Intel Technology Journal*, Q3 1997 by M. Mittal et al. Further information on SSE is available in *The Internet Streaming SIMD Extensions, Intel Technology Journal*, Q2 1999 by S. Thakkar and T. Huff. When referenced herein, IA-32 and IA-32 ISA include the MMX® and SSE enhancements. The IA-32 ISA is presently implemented in, for example, the INTEL® PENTIUM® III family of processors.

The second mode is IA-64 which implements what is known as the IA-64 ISA as described in *IA-64 Application Instruction Set Architecture Guide*, rev. 1.0 and *IA-64 Application Developer's Architecture Guide*, rev. 1.0. The INTEL® ITANIUM™ family of processors will provide support for both a 32 bit word ISA, the IA-32, and a 64 bit word ISA, the IA-64. All of these documents are published by and available from Intel Corporation of Santa Clara, Calif., www.intel.com.

When implementing a multi-mode processor that supports two different ISAs, some functionality included in one ISA may not be included in the other ISA. For example, the IA-64 ISA defines 128 82 bit wide floating-point registers while the IA-32 ISA defines eight floating point registers that are 80 bits wide. In addition, the IA-64 ISA also has various other functionality not included in the IA-32 ISA. Pertinent in this case is what is known in the IA-64 ISA as a "not a thing value" or NaTVal token, a processor known value. The IA-64 ISA provides for control and data speculation, and NaTVals are used in the speculation methods of the IA-64 ISA. Control speculation can be described simply as performing a sequence of operations to produce a result before the result is needed to eliminate any delay in waiting for the result, thus increasing system performance. Similarly, data speculation can be described simply as requesting and loading data before it is needed to eliminate any delay in waiting for the data, thus increasing system performance. When floating-point data cannot be loaded in response to a speculative floating-point operation or data load request, the floating-point register that was to receive the desired data is set to a token corresponding to NaTVal.

In one embodiment, NaTVal is a processor known 82 bit floating-point token with a sign bit of 0, an exponent of 0x1FFFE and a significand of 0 such that bits 0-63 are 0, 64-80 are 0x1FFFE and bit 81 is 0. This processor known value causes the floating-point unit to ignore the requested operation and propagate the NaTVal as output, typically causing the processor to later request the data and/or operation non-speculatively when it is actually needed. In the IA-64 ISA, the NaTVal token represents to the processor and the floating-point unit that the data value in the register is "not a thing" and no operations should be performed on the data. The IA-32 ISA does not support NaTVal tokens.

FIG. 1 illustrates one embodiment of a processor that implements the method and apparatus of the present invention to achieve architectural correctness when providing floating-point support in a multi-mode processor. Processor 100 of FIG. 1 includes first instruction set engine 110 and second instruction set engine 120 coupled to floating point registers 150 and floating point unit 160. Processor 100 also includes processor status register 170 which is coupled to floating point unit 160. In one embodiment, mode identifier 172 is included in processor status register 170. Each of first instruction set engine 110, second instruction set engine 120, floating point registers 150, floating point unit 160 and processor status register 170 may be coupled to one another via bus 130. In one embodiment, the first instruction set engine and second instruction set engine each provide microcode or other support for different ISAs. In one embodiment, mode identifier 172 is a bit that is set to one when the processor is in a first instruction set mode and zero when the processor is in a second instruction set mode. Although one floating-point unit 160 is depicted, processor 100 may include multiple floating-point units. In addition, although the number of floating point registers 150 in one embodiment is 128, the number of floating point registers 150 may be both greater or smaller than 128. Moreover, although only bus 130 is depicted, additional buses may be included in processor 100. Further, in another embodiment, memory such as, for example, random access memory (RAM) or cache (not shown) may be coupled to bus 130 and/or the other elements. Processor 100 may be included in any electronic system including, for example, computers, imaging equipment and wireless communication equipment.

In one embodiment in which a multi-mode processor supports two different ISAs, the processor includes floating-point registers and floating-point units which are shared between a first instruction set engine and a second instruction set engine. In this embodiment, to support both the IA-32 and IA-64 ISAs, the processor shares the floating-point registers and floating-point units between an IA-32 engine and an IA-64 engine. More specifically, the IA-32 ISA includes eight 64 bit MMX® registers and eight 128 bit SSE registers to support the MMX and SSE enhancements to the original Intel 32 bit word ISA. The IA-64 ISA does not directly provide for either of these IA-32 ISA defined sets of registers. However, the IA-64 ISA defines 128 floating-point registers numbered 0 through 127, each of which are 82 bits wide. To accommodate the MMX® registers and the SSE registers of the IA-32 ISA, in one embodiment, the first instruction set engine, the IA-32 engine, ignores the exponent and the sign bit and, as such, only accesses the data stored in the 64 bit significand portion of the IA-64 ISA floating-point registers.

Moreover, in this embodiment, 16 floating-point registers, namely IA-64 ISA floating point registers 8 through 31, are shared by the IA-32 engine and the IA-64 engine. In certain situations, the IA-32 engine maps eight IA-32 ISA MMX® registers to floating-point registers 8 through 15. In yet other instances, the IA-32 engine maps eight 128 bit IA-32 ISA Streaming SIMD registers to 16 floating-point registers comprising floating-point registers 16 through 31 arranged in eight pairs such that the data in the significand portion of the even number IA-64 ISA floating-point registers (i.e., floating-point registers 16, 18, 20, . . . 30) contain bits 0 though 63 and the odd number IA-64 ISA floating-point registers (i.e., floating-point registers 17, 19, 21 . . . 31) contain bits 64 through 127 of the eight 128 bit IA-32 ISA Streaming SIMD registers. In addition, the IA-32 ISA defines 80 bit floating-point registers which are mapped to certain 82 bit IA-64 ISA floating-point registers by the IA-32 engine.

When the IA-32 engine emulates its 80 bit floating-point registers, MMX® instructions and Streaming SIMD instructions on the 82 bit IA-64 ISA floating-point registers, in certain situations, a bit sequence corresponding to a NaTVal token may be created. If all aspects of the floating-point units are shared between the IA-32 engine and the IA-64 engine, the floating-point units will process floating-point data as NaTVals when a floating-point register actually contains data resulting from an IA-32 ISA floating-point request or result. To avoid such situations and to prevent the processor from behaving in an unsupported way which may result in an unrecoverable error possibly crashing the system, pre-processing hardware and post-processing hardware is included in the floating-point units to provide mode dependent NaTVal handling.

Figure 2:
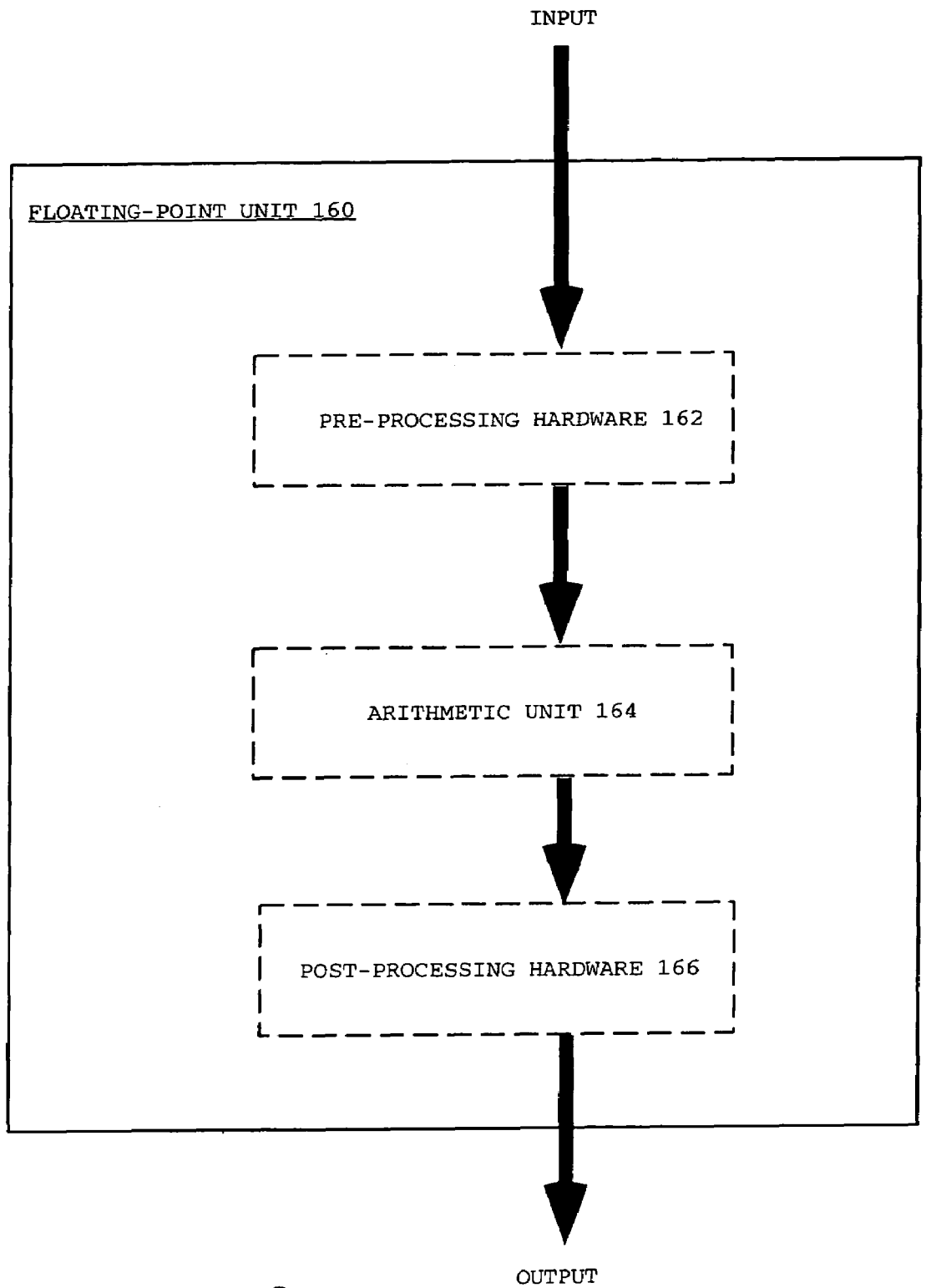
FIG. 2 illustrates one embodiment of a floating-point unit of the present invention.

FIG. 2 illustrates one embodiment of a floating-point unit of the present invention. Floating-point unit 160 receives input which is processed by pre-processing hardware 162. Pre-processing hardware 162 detects whether a NaTVal token (or other tokens and special values) is present in input operands. Arithmetic unit 164 then performs the requested mathematical operation or skips the requested operation responsive to the input and in view of whether any and what tokens are found in the input operands by pre-processing hardware 162. Post-processing hardware 166 then generates the output, typically, the mathematical result calculated by arithmetic unit 164. When a NaTVal token (or other token or special value) is detected by pre-processing hardware 162, depending on what mode the processor is in, values other than a true arithmetic result are prepared by post-processing hardware 166. With regard to one embodiment, when in a second mode, post-processing hardware 166 returns a NaTVal token if a NaTVal token was detected in any of the input operands by pre-processing hardware 162. A more detailed description of what occurs in floating point unit 160 with regard to NaTVal handling is set forth in FIG. 3.

With regard to tokens, in one embodiment, the processor's implementation of the IA-64 ISA includes special processing for various tokens and other special values. The only token pertinent is NaTVal. That the floating-point components perform other token-related and special value tasks is briefly discussed to put the NaTVal handling method and apparatus in the context of one embodiment. Tokens are processor known values necessitated by adhering to the requirements of the I.E.E.E. Floating-Point Standards or resulting from a processor's design and implementation of an ISA. For example, the value infinity has certain characteristics and properties such that pre-processing hardware 162 detects whether the input contains a token representing infinity so that the arithmetic unit is bypassed and the post-processing hardware sets an appropriate result. That is, for example, any positive number multiplied by or added to infinity results in infinity. Tokens are defined to represent certain I.E.E.E. standard encodings for special situations and to represent processor specific functionality such as NaTVals. (For further information on how the IA-64 ISA conforms to I.E.E.E. standard 754, see *IA-64 Floating-Point Operations and the IEEE Standard for Binary Floating-Point Arithmetic, Intel Technology Journal*, Q4 1999 by M. Cornea-Hasegan and B. Norin.) In addition, pre-processing hardware detects special values contained in the operands. For example, when a zero is detected as an operand and the input operation is multiply, arithmetic unit 164 is bypassed and post-processing hardware 166 outputs the result as zero.

Figure 3:
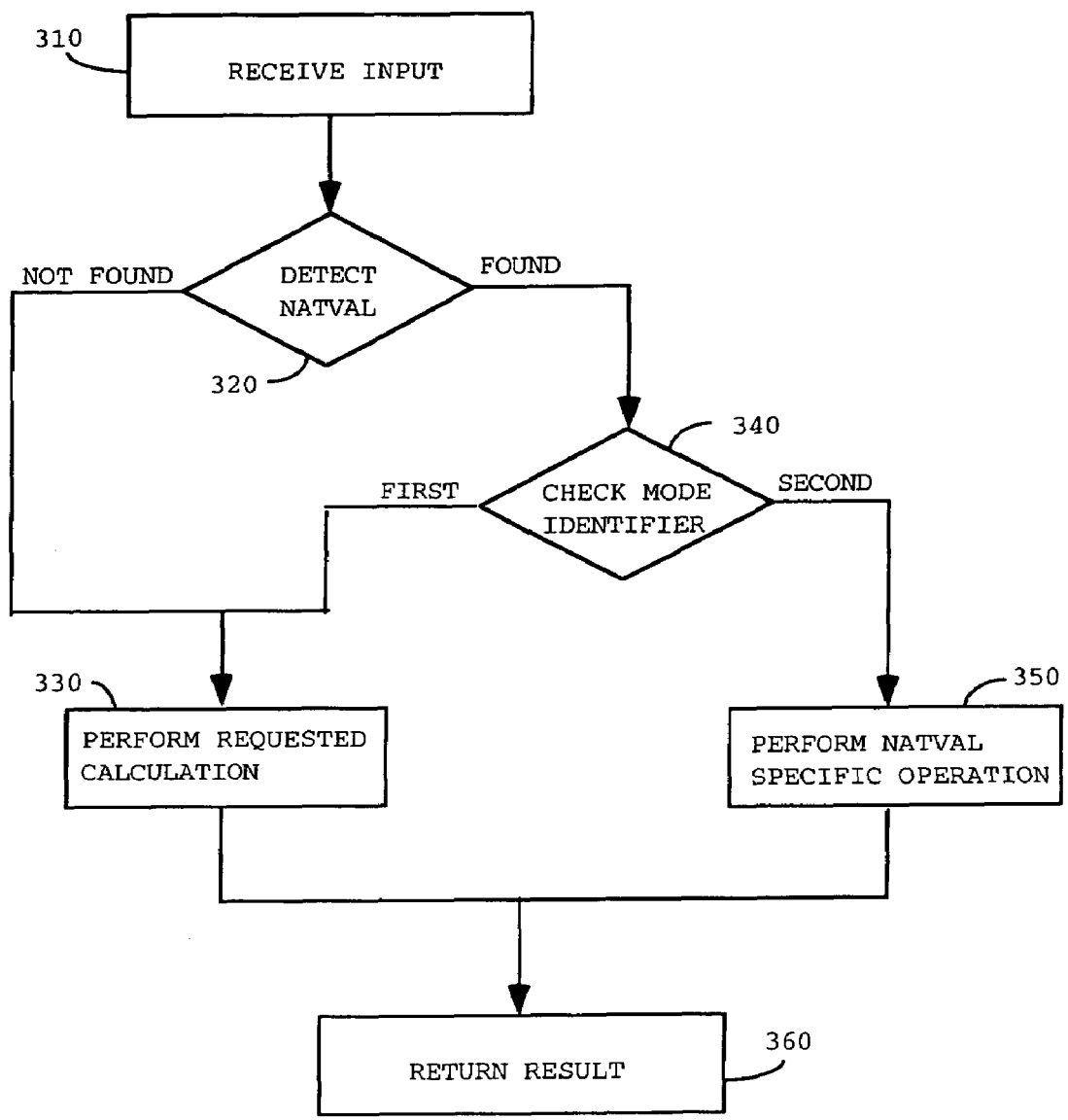
FIG. 3 is a flow chart depicting one embodiment of the method of the present invention to achieve architectural correctness when providing floating-point support in a multi-mode processor.

FIG. 3 is a flow chart depicting one embodiment of the method of the present invention to achieve architectural correctness when providing floating-point support in a multi-mode processor. After the floating-point unit receives input in block 310, pre-processing hardware detects whether a NaTVal is present in any of the input, as shown in block 320. More specifically, the input is comprised of at least one operand and at least one operation request. Pre-processing hardware detects whether any of the operands of the input correspond to a NaTVal token. If an operand containing a NaTVal token is not found in the input, the requested floating-point mathematical operation is performed on the input operands by the arithmetic unit as shown in block 330.

If a NaTVal token is found in any of the input operands, a mode identifier is checked to determine whether the processor is in a first instruction set mode or a second instruction set mode, as shown in block 340. If in a first instruction set mode, IA-32 ISA, the requested floating-point mathematical operation is performed on the input operands by the arithmetic unit as shown in block 330. After the operation has completed, the result of the operation is returned as output as shown in block 360.

However, if the processor is in a second instruction set mode, IA-64 ISA (and a NaTVal token was found in one of the input operands), post-processing hardware performs a NaTVal specific operation, as shown in block 350. Recall that NaTVal signifies that the operand data has not yet been loaded into a designated floating-point register. As such, when a NaTVal token is detected, the arithmetic unit is bypassed and the requested operation is not performed. The post-processing hardware propagates the NaTVal token. That is, the result produced by post-processing hardware at block 350 is a processor known value corresponding to a NaTVal token. This result is then returned as output as shown in block 360. In another embodiment, this method and apparatus may be used to share floating-point units among more than two instruction set engines within a processor by using a mode identifier comprised of more than one bit and providing additional pre-processing and post-processing hardware as needed.

Achieving architectural correctness in a multi-mode processor supporting two ISAs, each providing floating-point math support, may be achieved, in another embodiment, by adding software in the form of microcode to one of the instruction set engines, namely the IA-32 engine. However, adding such software may degrade performance of IA-32 ISA emulation as software would have to be added to many commonly executed areas of the IA-32 engine. In addition, such an embodiment increases the size of the processor known as the processor's die as the microcode software is implemented as firmware on the processor. Yet another embodiment is achieved by adding software support external to the processor. Such an embodiment may result in decreased performance of IA-32 ISA emulation and other inherent complexities.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A multi-mode processor comprising:
   a first instruction set engine to process instructions from a first instruction set architecture (ISA), the first ISA designed for a first processor having a first word size that defines the maximum number of bits that the first processor can handle as a single unit;
   a second instruction set engine to process instructions from a second ISA, the second ISA designed for a second processor having a second word size that defines the maximum number of bits that the second processor can handle as a single unit, a bit length of the second word size being greater than a bit length of the first word size;
   a mode identifier;
   a plurality of floating-point registers shared by the first instruction set engine and the second instruction set engine; and
   a floating-point unit coupled to the floating-point registers, the floating-point unit including:
   pre-processing hardware to bypass an arithmetic unit if a token exists in an input and the mode identifier indicates a second ISA mode;
   the arithmetic unit to process the input to produce an arithmetic result unless the input bypasses the arithmetic unit; and
   post-processing hardware to perform a token specific operation if another token exists in the input and bypasses the arithmetic unit to produce an output.

2. The multi-mode processor of claim 1 wherein the mode identifier is one of a plurality of bits in a processor status register.

3. The multi-mode processor of claim 1 wherein the input includes data stored in at least one of the floating-point registers.

4. The multi-mode processor of claim 1 wherein the floating-point registers are 82 bits wide, and wherein the token being an 82 bit processor known value.

5. The multi-mode processor of claim 1 wherein the token represents a "not a thing value" (NaTVal) that defines an unsuccessful speculative load request.

6. The multi-mode processor of claim 1 wherein the floating point registers each comprise:
   a sign bit,
   an exponent; and
   a significand.

7. The multi-mode processor of claim 1 wherein the mode identifier indicates whether the processor is in a first mode or a second mode.

8. The multi-mode processor of claim 1 wherein the mode identifier indicates whether the processor is in a 32 bit word ISA mode or a 64 bit word ISA mode.

9. A method in a multi-mode processor comprising:
   fetching an input from at least one of a plurality of floating-point registers;
   detecting whether the input contains a token;
   if the token is detected in the input, checking what mode the processor is in;
   when the mode the processor is in is a first word size instruction set architecture (ISA) mode, providing the input to an arithmetic unit to render an arithmetic result, the first ISA designed for a first processor having the first word size that defines the maximum number of bits that the first processor can handle as a single unit;
   when the mode the processor is in is a second word size ISA mode, bypassing an arithmetic unit to post-processing hardware to perform a token specific operation, the second word size ISA designed for a second processor having a second word size that defines the maximum number of bits that the second processor can handle as a single unit, a bit length of the second word size being greater than a bit length of the first word size; and
   producing an output based upon the mode the processor is in.

10. The method of claim 9 wherein the input is comprised of at least one operand and at least one operator; wherein detecting comprises examining the at least one operand to determine whether any of the operands correspond to the token; and wherein checking comprises examining a mode identifier to determine whether the processor is in the first mode or the second mode.

11. The method of claim 10 wherein the first mode is a 32 bit word ISA mode and the second mode is a 64 bit word ISA mode.

12. The method of claim 9 wherein processing comprises executing at least one operation on the at least one operand according to the at least one operator to achieve a result.

13. The method of claim 9 wherein performing comprises propagating the token; and wherein producing output comprises setting the output to be the token.

14. The method of claim 9 wherein the token represents a "not a thing value" (NaTVal) that defines an unsuccessful speculative load request.

15. The method of claim 9 wherein checking comprises checking a mode identifier.

16. The method of claim 9 wherein checking comprises checking a mode identifier bit in a processor status register.

* * * * *